L. S. ROBBINS.
DISTILLING ACIDS AND NAPHTHA FROM ROSIN.
No. 8,490. Patented Nov. 4, 1851.
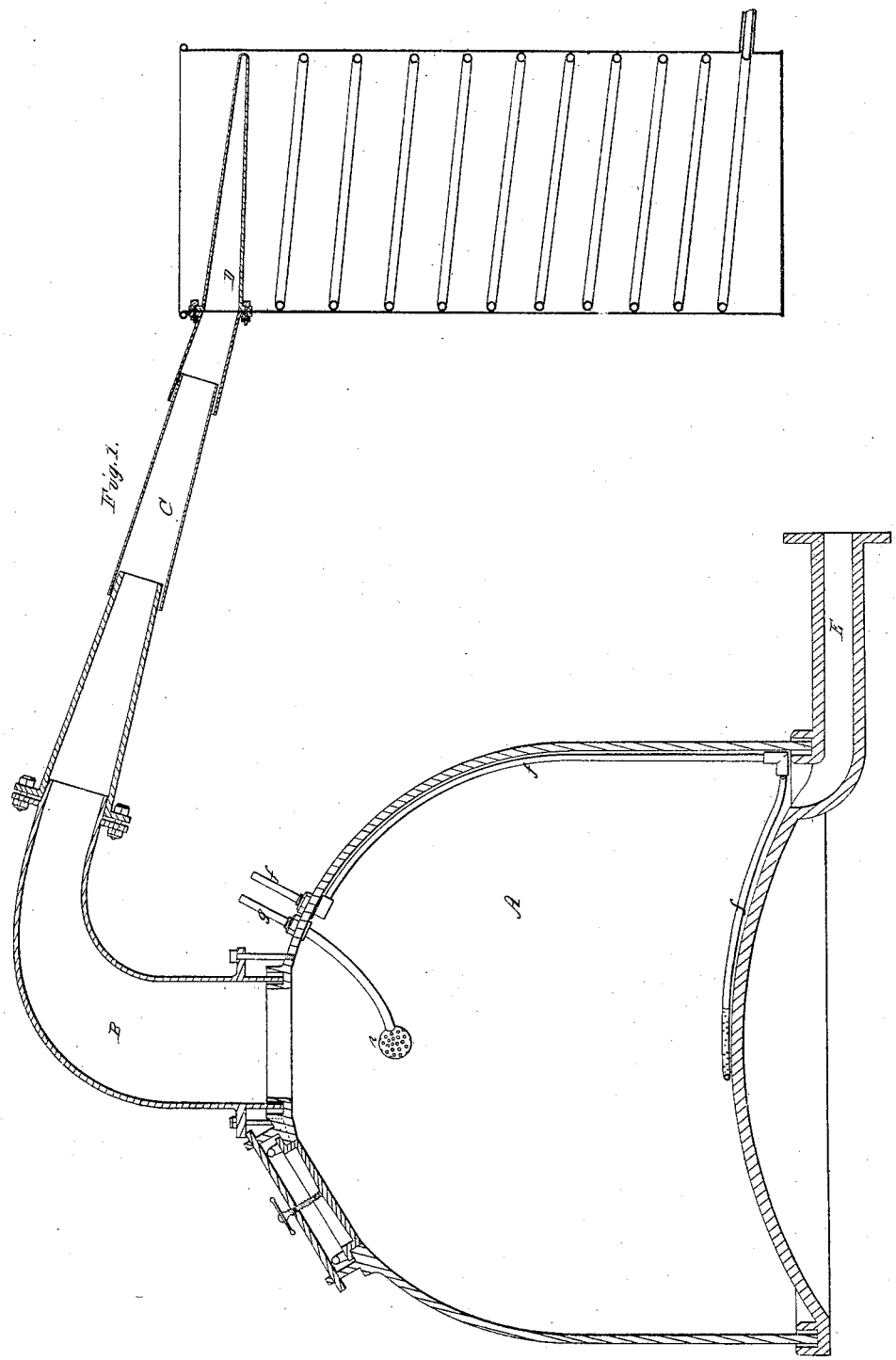

UNITED STATES PATENT OFFICE.

L. S. ROBBINS, OF NEW YORK, N. Y.

IMPROVEMENT IN DISTILLING ACID AND NAPHTHA FROM ROSIN.

Specification forming part of Letters Patent No. 8,490, dated November 4, 1851.

*To all whom it may concern:*

Be it known that I, LOUIS S. ROBBINS, of the city, county, and State of New York, have invented a new and improved process of distilling rosin, by which I am enable to produce therefrom, in a separate and distinct form, acid, naphtha, and oil; and I do hereby declare that the following is a full and exact description thereof, reference being had to the accompanying drawing, making a part of this specification.

A is the body of the still, which I shall hereinafter designate by the word "still." B is a curved pipe connected with the top of the still; C, a movable joint of pipe f or connecting the curved still-neck B with the still-worm D. $f$ is a steam-pipe, which passes through a close joint in the side of the still, and thence is conducted down the inner side and along the bottom of the same to near the center of the botom of the still, where it is curved into a circular form around the center thereof. The annular terminating portion of the said steam-pipe which surround sthe center of the bottom of the still is perforated with small holes for escape the steam a portion of the time during my improved process of distillation. A spiral or any other shape may be given to the perforated terminating portion of the steam-pipe $f$, which surrounds the center of the bottom of the still.

A thermometer must be so combined with the still as to indicate the temperature of whatever may be contained in the interior thereof. I make use of Fahrenheit's thermometer, and consequently all references to temperature in this specification of my improved process of distilling rosin must be interpreted with reference to that instrument.

My new and improved method or process of distilling rosin, by which I am enabled to produce therefrom in a separate and distinct form acid, naphtha, and oil, I will describe as follows: Place in the still A a sufficient quantity of rosin to about two-thirds fill it when the rosin is melted. Before or at the time of making the fire under the still moisten the rosin contained therein by blowing steam into it through the pipe $f$. Detach the still from its worm prior to making a fire under it, or before the fire has made much progress, by removing the connecting-pipe C from its place, for the reason that the rosin is violently agitated within the still during the early stages of raising its temperature, and until all the acid and water is expelled therefrom, during which agitation the rosin is liable to overflow, and should it be allowed to overflow into the still-worm, great injury would result therefrom, and an explosion of the still would probably immediately follow. The acid will immediately begin to escape from the neck of the still when the thermometer indicates the temperature of the rosin to be (325°) three hundred and twenty-five degrees, at which time the fire under the still must be checked, and so regulated as to keep the temperature of the melted rosin therein somewhere between 300° and 325°, until the acid shall cease to flow from the neck of the still. As soon as the flow of the acid from the neck of the still ceases, the still must be connected to its worm by placing the connecting-pipe C in its proper position and luting the joints at each extremity thereof; and then steam must be steadily blown through the pipe $f$ into the bottom of the still, while the fire under the same is so regulated as to keep the contents of the still at about the same range of temperature that was required to expel the acid therefrom, as before described. The steam, as it rises through the melted matter in the still, takes up and carries with it in the form of vapor the naphtha that was contained in the rosin, and these two mingled vapors pass off into the worm of the still, where they are condensed, and flow into a suitable receiving-vessel. This said operation will continue until all the naphtha that was contained in the rosin placed in the still has been discharged, which will be indicated by the character of the discharge from the still-worm, and also can be ascertained by so graduating the receiving-vessel as to indicate when a quantity of naphtha about equal to fifteen per cent. in bulk of the rosin originally placed in the still has been discharged from the still-worm. As soon as the naphtha ceases to flow from the still-worm, the fire must be increased under the still until the contents thereof have been raised to a temperature of 550°, the steam all the while being allowed to flow into the still through the pipe $f$, as in the preceding part of my improved process of distillation, and which flow of steam into the still must be continued during all the remaining parts and divisions of my said process of distillation, which are hereinafter described. The oil will commence passing off in the form of vapor from the contents of the still, mingled with the steam blown into the same, when the temperature of said contents reach 550°, and these two mingled vapors will pass into and be condensed in the still-worm, and thence be discharged into a suitable receiving-vessel. The temperature of 550°, or thereabout, must be preserved within the still until the flow of oil from the still-worm nearly or quite ceases, which will take place when a quantity of oil equal to about twenty-five per cent. of the rosin originally placed in the still has been discharged. The contents of the still must then be raised to a temperature of 600°, when the flow of oil and water from the still-worm will recommence and continue, while the said temperature of 600°, or thereabout, is maintained within the still until a second quantity of oil about equal to twenty-five per cent. of the rosin originally placed in the same has been discharged from the still-worm, when the flow of oil will nearly or quite cease. The temperature within the still must then be raised to 650°, or thereabout, when the flow of oil and water from the still-worm will recommence and continue, while the temperature within the still is retained at or about the said temperature of 650° until a third quantity of oil about equal to twelve and a half per cent. of the rosin originally placed in the still has been discharged, when the flow of oil from the still-worm will cease, and the fire under the still must be extinguished.

The residuum of the rosin remaining in the still after extracting therefrom the acid, naphtha, and oil, by the before-described process, is of a nature similar to pitch, and is applicable to similar purposes and uses. This residuum is drawn off through the pipe E, after standing a sufficient length of time—generally over night—to cool down to a safe temperature for exposure to the atmosphere and to be received into vats.

The steam-pipe $g$, which passes through a close joint in the side of the still, and terminates in a perforated head or coil, $h$, in the upper portion of the still, and which has not been before referred to, serves the following purpose, to wit: Steam is injected from this pipe into the volatilized oil during its passage from the still to the condensing-worm, which has a purifying and partially-bleaching effect upon the oil.

Having thus fully described my new and improved process of distilling rosin, what I claim therein as my invention, and desire to secure by Letters Patent, is—

1. The process of separating the acid and water arising from the decomposition of rosin at the temperature of 325° Fahrenheit, or thereabout, by means of fire-heat, substantially in the manner herein set forth.

2. In combination with the above, the process of separating the naphtha from the other component parts of the rosin, by preserving the temperature of the liquid mass within the still at about the range of 325° Fahrenheit, as above stated, and injecting steam into the same, by which I am enabled to throw off the naphtha at the same temperature employed for throwing off the acid.

3. I do not intend to limit my improved process of distillation, as hereinbefore described, to the production of oil from rosin, but shall employ it for redistilling the crude article known as "rosin-oil."

LOUIS S. ROBBINS.

Witnesses:
Z. C. ROBBINS,
J. S. BROWN.